April 15, 1952 W. J. FEDORCHAK 2,593,127
ELECTRONIC INSPECTION OF GLASS CONTAINERS
Filed Jan. 24, 1950 3 Sheets-Sheet 1

Inventor
W.J. FEDORCHAK

By Rule and Hoge.
Attorneys

April 15, 1952     W. J. FEDORCHAK     2,593,127
ELECTRONIC INSPECTION OF GLASS CONTAINERS
Filed Jan. 24, 1950     3 Sheets-Sheet 2
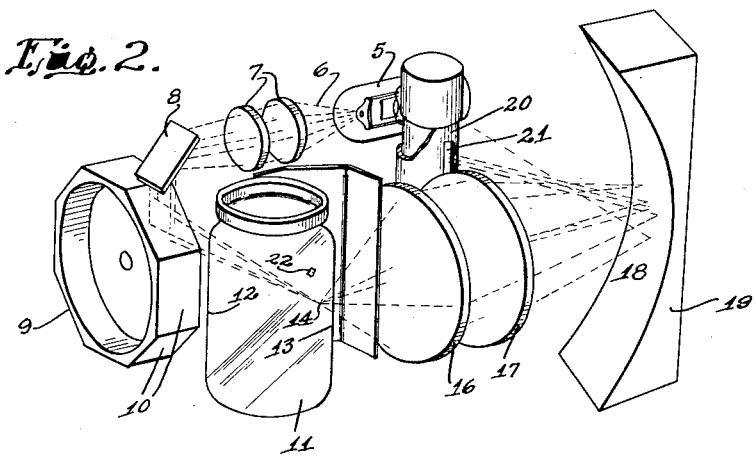
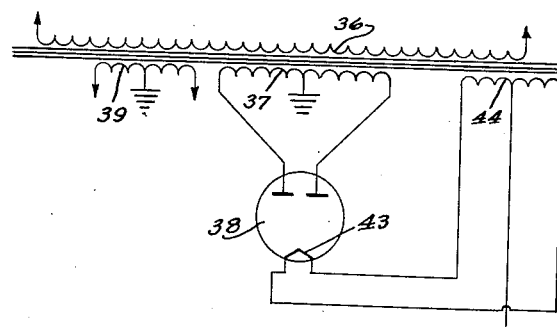
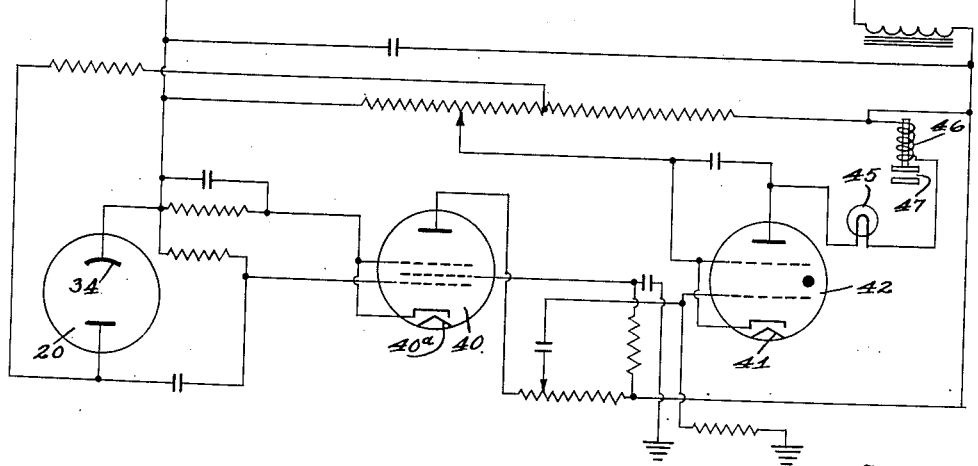
Fig.3.
Inventor
W.J. FEDORCHAK
By Reele and Hoge,
Attorneys April 15, 1952 W. J. FEDORCHAK 2,593,127
ELECTRONIC INSPECTION OF GLASS CONTAINERS
Filed Jan. 24, 1950 3 Sheets-Sheet 3
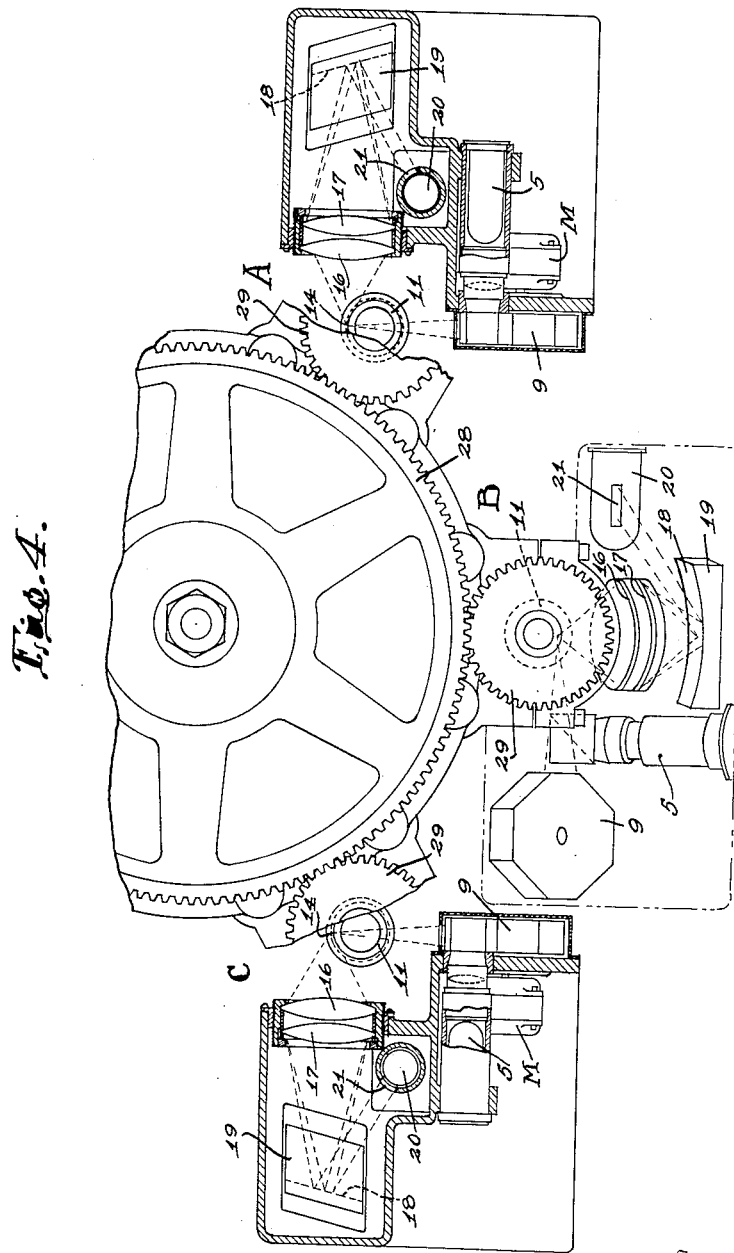
Inventor
W.J.FEDORCHAK
By Rule and Hoge.
Attorneys Patented Apr. 15, 1952

2,593,127

UNITED STATES PATENT OFFICE 2,593,127

ELECTRONIC INSPECTION OF GLASS CONTAINERS

William J. Fedorchak, Granite City, Ill., assignor to Owens-Illinois Glass Company, a corporation of Ohio Application January 24, 1950, Serial No. 140,240

11 Claims. (Cl. 88—14)

My invention relates to a method and apparatus designed for inspecting the inner surfaces of transparent hollow ware such, for example, as glass bottles and jars, for the purpose of detecting defects or flaws at such surfaces. The invention in the form herein illustrated is particularly designed for inspecting glass jars such as are used for packaging food products and other commodities and is so described herein although it will be understood that the invention may be used for inspecting various other containers or articles. The invention provides a method and means for scanning the inner surface of a jar or the like with a light beam or beam of radiation for detecting sharp projections of glass (ordinarily referred to by the shop term "spikes"), fragments of glass either loosely attached or fused to the surface, stones, blisters, seeds, checks or any other interior surface or wall thickness defects, all of which are herein referred to as flaws or defects.

I have found that if a sufficiently high concentration of light is projected on a spike, a fragment of glass or the like, on the inner surface of a glass jar, it will reflect a considerable amount of this light in all directions, but the greatest intensities are at 90° to the path of the incident light. I have further discovered that such projected light must strike the glass fragment or spike from the inside of the jar, that is, the light must approach the glass or defect from the interior of the jar and is directed outwardly from the jar, in order to get the maximum reflection. One peculiarity of this phenomenon is that the projected light can pass through one wall thickness of the glass before striking the flaw on the opposite wall and the resultant reflection from the surface of such flaw is still maintained at a high level.

The present invention utilizes these principles in apparatus designed for inspecting glass jars or the like on a commercial scale, the apparatus being designed for testing the jars in rapid succession for discovering any surface defect on the inner surfaces of a jar, including both the side and bottom wall surfaces of the jar.

The invention provides a plurality of testing units of similar construction, operating in coordination for testing the inner side wall surface with the light beams and also testing the inner bottom surface by means of a light beam projected in a downwardly inclined direction through a side wall and against such bottom surface. In its preferred form, each side wall testing unit comprises a light source, preferably a concentrated arc lamp, condensing lenses by which the light beam is condensed, a reflecting mirror by which the light is reflected onto a revolving reflector having reflecting surfaces by which the light beam is reflected and directed against one side of the jar under test, the light beam passing through one side wall of the jar and onto the inner surface of the opposite side wall. The light beam is focused approximately to a point or to a small spot on such inner surface. The rotating mirror causes the spot of light to traverse the said wall vertically. At the same time, the jar is rotated about its axis so that the light beam scans the entire inner surface of the side walls of the jar. The relative speeds of rotation of the jar and the revolving reflector are such that the entire surface is covered, as more fully set forth hereinafter.

When a spike or other flaw on the said inner surface is brought in the path of the light beam, it reflects a considerable amount of the light, the greatest intensity being at angles of 90°, said reflected light passing through the wall of the jar and being many times greater than the normal amount reflected from said surface. A portion of this light reflected by a flaw at said surface is passed through collecting lenses and then reflected by a concave mirror which directs the reflected light against a photoelectric tube. The sudden increase in the amount of light directed to the tube or photoelectric cell produces an impulse in the electronic circuit of said cell. This impulse is amplified and may then be used to operate the trigger circuit provided by a gas tube or Thyratron. Ejector mechanism controlled by a relay switch in the trigger circuit, operates to eject the defective jar or segregate it from the jars which pass the test.

This application discloses subject matter also disclosed in my copending applications filed December 16, 1949, Serial Number 133,414, Inspecting Interior Surfaces of Glass Containers and Serial Number 133,415 filed December 16, 1949, Inspecting Method and Apparatus.

Referring to the accompanying drawings:

Fig. 2 is a diagrammatic view of one of the testing units;

Fig. 3 is a wiring diagram of the electrical mechanism; and

Fig. 4 is a part sectional and partly diagrammatic plan view of the apparatus with parts broken away.

Figure 1:
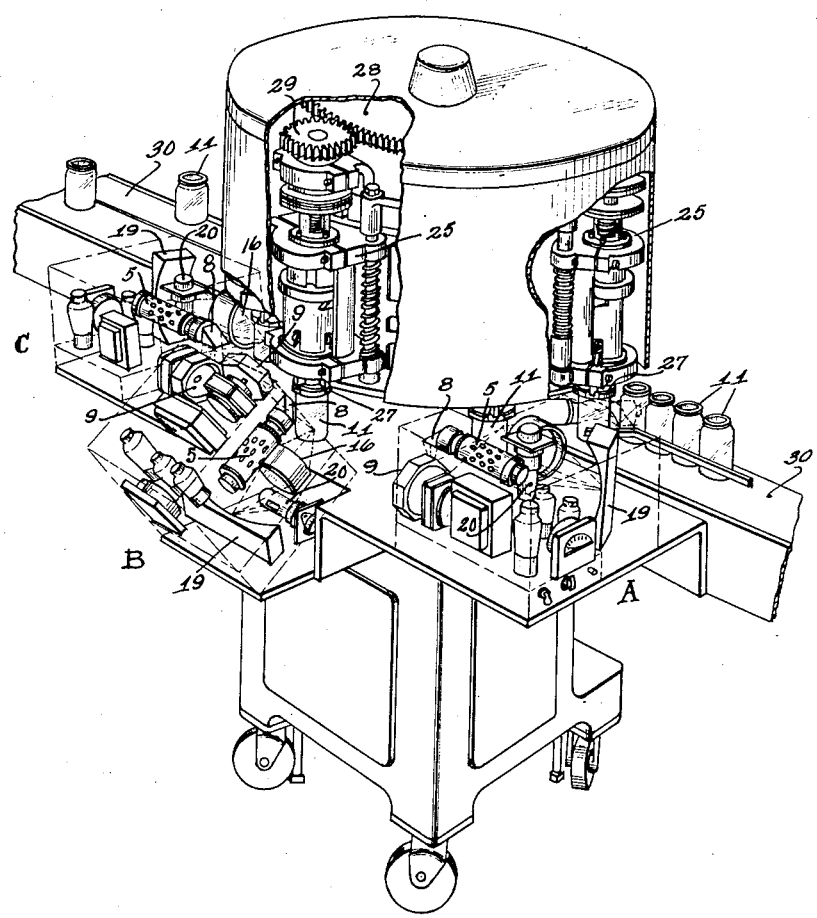
Fig. 1 is a perspective view, partly diagrammatic and with parts broken away, of an apparatus embodying the principles of my invention, and designed for testing glass jars.

Referring particularly to Fig. 2, the testing unit, as shown, comprises an arc lamp 5 which supplies a concentrated beam of light or radiation. The beam 6 (shown in broken lines) passes through condensing lenses 7 and is directed against a mirror 8 which reflects the beam downwardly against a rotating octagon shaped mirror or reflector 9, the reflecting surfaces 10 of which, as the reflector rotates, operate in succession to direct the light beam against the jar 11 which is under test. The beam passes through the vertical side wall 12 of the jar and through the interior of the jar and is focused on the opposite side wall 13 at the point 14 which is close to the focal point of the beam so that the light is condensed to a small area or spot. Each facet 10 of the revolving reflector, as it traverses the path of the light beam, causes the spot of light 14 to move vertically through substantially the full length of the side wall 13. The reflector is rotated by a motor M (Fig. 4) at a high speed. For example, it may be rotated by a synchronous type motor at a speed of 3600 R. P. M. the motor being directly connected to the reflector which, with its 8 reflecting surfaces, gives the effect of 28,800 vertical sweeps of the spot of light per minute or 480 sweeps per second. The jar 11 which may be, for example, 6" in circumference, measured at its inner surface, may revolve at 210 R. P. M. so that vertical sweeps are spaced at about .043" between centers on such inner surfaces. With these proportions, a spot of light .062" in diameter will scan the entire inner side surface of the jar. These dimensions and speeds are given only by way of a practical example, and are not to be construed as a limitation of the invention.

When a flaw in the jar surface is brought into the path of the light beam, as, for example, at the point 14, light is reflected from the surface of the flaw and passes through the wall 13 and through collecting lenses 16 and 17 and is directed against concave reflecting surface 18 of a mirror 19. The beam reflected from the surface 18 is directed to a photoelectric cell 20 having an elongated slot 21 in the side wall through which the light passes. As the jar 11 rotates, any flaw on the inner surface thereof, as for example, a spike or piece of glass 22, when brought into the path of the scanning beam, causes a reflection of the beam many times greater in intensity than the normal reflected light. This intensified light striking the photoelectric cell causes a sudden impulse or voltage change in the cell circuit, which impulse is amplified and utilized as presently described.

The cell is selected to be sensitive to the radiation from the lamp 5. Also the radiation from the lamp is of a wave length to which the glass forming the container 11 is transparent. The parts are so correlated and the beam of radiation so focused that effective signals are only transmitted to the photo-cell from flaws on the inner surface of the container. Flaws or irregularities at the outer surface of the container are ineffective for giving an operative signal from the cell. This is of practical importance as it prevents signals being given either by exterior surface flaws, surface decorations or printed matter, seams, or other irregularities.

Referring to Fig. 1, the jars, while being tested, are rotated about their vertical axes by rotating mechanisms or units 25, each of which comprises a pair of gripping jaws 27 or chuck. The chuck is rotated by means of a driving gear 28 running in mesh with a pinion 29 on the chuck spindle. The jars 11 are conveyed in a continuous row to the inspecting mechanism by a horizontal continuously traveling belt conveyor 30 which brings the jars to the first testing station. As shown, testing units are provided at stations A, B, and C. Testing unit at station A may be of the construction illustrated in Fig. 2 as above described and operates to test the entire inner side wall surface of the jar.

The jar is then advanced to station B where the inner bottom surface is tested. The testing unit at station B may be substantially like that at station A. It is so arranged that the light beam is directed from the revolving reflector 9 in a downwardly inclined direction so that the beam passes through the side wall of the jar and is focused to a small spot on the bottom surface. The rotation of the reflector 9 causes the focused or condensed spot of the light to move diametrically across the bottom surface of the jar so that the combined rotation of the jar and reflector 9 causes the spot of light to scan the entire bottom surface.

The jar is then advanced to station C where the inner side wall surface of the jar is scanned and tested in the same manner as at the station A. As above noted, the radiation reflected from a defect is of the greatest intensity in directions substantially at right angles to that of the incident light beam. I have found, however, that some glass particles or flaws will reflect strongly in one direction at a right angle to the incident light beam but not in the opposite direction, or the reflection in such opposite direction is comparatively weak and insufficient to give a reliable signal. Accordingly, the invention provides testing units at both the stations A and C, so arranged that they will receive the reflected light from opposite directions. Thus as shown at station A, the condensing lenses 16, 17 are arranged to receive the light reflected to the right from a flaw at the point 14, whereas at station C, the lenses receive the light reflected in the opposite direction from the same flaw, the jar 11 being in the same rotative position in both instances. This arrangement provides a reliable test for defects which a single testing unit might fail to register. The same principle is applied in testing the bottom surfaces of the jars at station B. In this instance, the rotation of the jar causes opposite sides of a flaw in the bottom surface to be brought into the light beam in alternation, so that a single testing unit serves for this double test.

The signals from the photoelectric cells are transmitted to an amplifier tube 40 (Fig. 3) which controls the trigger circuit of a gas filled tube 42, operating as presently described to give a signal and/or effect the operation of ejector means for discarding the defective ware.

After the jars are tested, they are delivered to the conveyor 30 at the far side (Fig. 1) of the testing apparatus. Any jars which fail to pass the test are segregated from the others by means of a rejecting mechanism referred to hereinafter.

Referring to the wiring diagram (Fig. 3) power is supplied through a transformer comprising a primary coil 36, and a secondary coil 37 connected to a rectifier 38. A secondary coil 39 supplies current to the heater element 40a of the amplifier tube 40 and the heater 41 of a gas filled tube or Thyratron 42. The cathode 43 of the rectifier 38 is heated by current supplied by a secondary coil 44.

When a photoelectric cell is actuated as above described, the impulse is amplified by the tube 40. The amplified signal is transmitted to the Thyratron 42, and fires the later. A signal lamp 45 and a relay coil 46 are connected in the plate circuit of the tube 42 so that when the tube is fired, the lamp 45 is lighted to give a signal. The coil 46 when energized, closes a relay switch 47.

The articles to be tested are brought in rapid succession to the testing stations where they are tested and then returned to the traveling conveyor 30. When a photoelectric cell 20 is actuated as above described, the closing of the relay switch 47 establishes a circuit for a reject mechanism which is thereby set and operates to segregate the defective article from those which pass the test.

Modifications may be resorted to within the spirit and scope of my invention.

I claim:

1. Apparatus for testing the inner surface of a glass container for detecting flaws in said surface, said apparatus comprising a light source, a reflector mounted for rotation about an axis, a motor geared to the reflector for rotating the reflector about said axis at a high speed, said reflector having light reflecting surfaces formed on its periphery, means for so positioning the reflector and container that said reflecting surfaces are in the path of a beam of radiation from said light source and reflect the beam and direct it against the said container so that the beam passes through the wall of the container to said inner surface, means for condensing and focusing the beam to a small spot at said inner surface, means cooperating with the rotating reflector for causing the condensed beam to scan said inner surface, and a photoelectric cell sensitive to said radiation and positioned in the path of radiation reflected from a flaw in said inner surface when the flaw is brought into the path of the said beam.

2. The apparatus set forth in claim 1 wherein the scanning means includes means for rotating the article about its axis at a predetermined speed relative to that of the reflector such that said spot is caused to scan the entire inner surface of the article.

3. The apparatus defined in claim 1, the said scanning means including means for supporting the container in upright position for rotation about its vertical axis, said rotating reflector being positioned to direct the reflected beam against the side wall of the container and having its axis of rotation extending in a direction perpendicular to said side wall whereby the said spot is moved lengthwise over the surface of the container, and means for rotating the container about its axis at such a speed relative to that of the rotating reflector that said spot is caused to scan the entire portion of said inner side wall surface coming within the limits of said lengthwise movement of the scanning spot.

4. Apparatus for inspecting the inner side wall surface of a glass jar for detecting surface flaws, said apparatus comprising means for supporting a jar in upright position and rotating it about its vertical axis at a predetermined speed, a light source from which a beam of radiation is directed, a reflector mounted for rotation about a horizontal axis and formed with a series of reflecting surfaces at its periphery, power means geared to said reflector and continuously rotating the reflector at a high speed about said horizontal axis while the jar is rotating about its vertical axis, means for directing the beam against said rotating reflector, the said reflector being so positioned relative to the jar that each of said reflecting surfaces reflects the beam against the side wall of the jar and through the jar to the inner surface of the side wall at the opposite side of the jar, means for condensing the beam to a small spot at said inner surface, the speed of rotation of the reflector being so proportioned relative to that of the jar that each of said reflecting surfaces moves said spot vertically over said surface of the jar a multiplicity of times during each complete rotation of the jar about its axis, a photoelectric cell sensitive to said radiation, and means for directing reflected radiation from a flaw in said surface to the said cell and thereby energizing the cell.

5. The apparatus defined in claim 4, including condensing lenses and a concave reflector, said condensing lenses being in the path of the radiation reflected from a said flaw and said concave reflector being interposed between said condensing lenses and the said cell in position to reflect the radiation and direct it to said cell.

6. Apparatus for inspecting the inner surfaces of hollow glass containers for detecting flaws at said surfaces, said apparatus including means for bringing the containers in succession to a testing station, means for rotating each container about its axis while at said station, means at said station for producing a beam of radiation and directing it against the side wall of the rotating container and through one wall of the container and to the opposite wall, means for focusing the beam to a small spot on the inner surface of said opposite wall, a scanning device mounted for rotation about its own axis, the latter being substantially perpendicular to the axis of the containers, the scanning device having a polygonal reflecting surface forming reflecting mirrors in the path of the beam of radiation, means for rotating the scanning device concurrently with the rotation of the container and thereby causing the spot to scan said inner surface while the article is rotating at said station, a photoelectric cell sensitive to said radiation, and means for directing reflected radiation from a flaw in said surface to the cell and thereby energizing the cell and producing an impulse in the cell circuit when the flaw is brought into the path of the scanning spot.

7. The apparatus defined in claim 6, including means for transferring each container from said testing station to a second testing station, means for rotating the container while at said second station, means for producing a beam of radiation at said second station and directing it against the inner bottom surface of the container and scanning said inner bottom surface, a second photoelectric cell, and means for directing reflected radiation from said bottom surface and energizing said second cell when a flaw in said bottom surface is brought into the path of the beam.

8. The apparatus defined in claim 7, said apparatus including means to transfer the article from the second station to a third station, and testing means at said third station substantially similar to that at said first station.

9. In combination with the apparatus defined in claim 6, means for amplifying the said impulse, a gas filled tube energized by said amplified impulse, and means in the trigger circuit of said gas filled tube for controlling an ejector mechanism.

10. The method of inspecting the interior cylindrical surface of a hollow cylindrical body for detecting flaws at said surface, said method comprising repeatedly scanning the said surface with condensed incident radiation directed against said surface and thereby repeatedly illuminating any flaw at said surface in the path of said radiation, subjecting photosensitive means to radiation reflected by the flaw in a direction substantially at right angles to that of the incident radiation striking the flaw during the first said scanning, and during a subsequent scanning subjecting photosensitive means to radiation reflected from the said flaw in a direction substantially opposite to that of the first mentioned reflected radiation and thereby insuring a reliable signal from any said flaw which may reflect the radiation more strongly in one of said directions than the other, the direction of the incident radiation relative to the reflecting surface of the flaw being substantially the same during both said reflections.

11. The method defined in claim 10, the said cylindrical body being positioned at one station during the first said scanning and at a different station during said subsequent scanning.

WILLIAM J. FEDORCHAK.

REFERENCES CITED

The following references are of record in the file of this patent:

UNITED STATES PATENTS

| Number | Name | Date |
|---|---|---|
| 2,265,037 | Gulliksen | Dec. 2, 1941 |
| 2,286,836 | Sachtleben | June 16, 1942 |
| 2,318,856 | Hoffman | May 11, 1943 |
| 2,426,355 | Kellogg | Aug. 26, 1947 |
| 2,481,863 | Owens | Sept. 13, 1949 |